United States Patent
Sugawara

(10) Patent No.: US 12,080,482 B2
(45) Date of Patent: Sep. 3, 2024

(54) CERAMIC ELECTRONIC DEVICE INCLUDING A RARE EARTH ELEMENT SOLID-SOLVED IN BARIUM TITANATE OF DIELECTRIC LAYERS

(71) Applicant: TAIYO YUDEN CO., LTD., Tokyo (JP)

(72) Inventor: Yu Sugawara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 53 days.

(21) Appl. No.: 16/900,587

(22) Filed: Jun. 12, 2020

(65) Prior Publication Data
US 2020/0402719 A1    Dec. 24, 2020

(30) Foreign Application Priority Data

Jun. 18, 2019  (JP) .................................. 2019-113181
Apr. 10, 2020  (JP) .................................. 2020-070840

(51) Int. Cl.
*H01G 4/30*  (2006.01)
*H01G 4/12*  (2006.01)
*H01G 4/248* (2006.01)

(52) U.S. Cl.
CPC .............. *H01G 4/30* (2013.01); *H01G 4/1227* (2013.01); *H01G 4/248* (2013.01)

(58) Field of Classification Search
CPC ........ H01G 4/30; H01G 4/1227; H01G 4/248; H01G 4/0085; H01G 4/12; C04B 35/638; C04B 2235/3206; C04B 2235/3224; C04B 2235/3225; C04B 2235/3262; C04B 2235/3418; C04B 2235/6025; C04B 2235/652; C04B 2235/658; C04B 2235/663; C04B 2235/667;
(Continued)

(56) References Cited

U.S. PATENT DOCUMENTS 6,051,516 A * 4/2000  Mizuno .............. C04B 35/4682
                                                    361/321.5
6,072,688 A    6/2000  Hennings et al.
(Continued)

FOREIGN PATENT DOCUMENTS

CN    103964840 A     8/2014
CN    106505144 A  *  3/2017
(Continued)

OTHER PUBLICATIONS

A Notice of Reasons for Refusal issued by the Japanese Patent Office, mailed Oct. 4, 2022, for Japanese related application No. 2018-220281. (2 pages).
A First Office Action issued by the State Intellectual Property Office of China on Jul. 2, 2021, for Chinese related application No. 201910167134.5 (17 pages).
(Continued)

*Primary Examiner* — David M Sinclair
*Assistant Examiner* — Daniel M Dubuisson
(74) *Attorney, Agent, or Firm* — Law Office of Katsuhiro Arai

(57) ABSTRACT

A ceramic electronic device includes: a multilayer chip in which each of dielectric layers and each of internal electrode layers are alternately stacked, a main component of the dielectric layers being $BaTiO_3$, wherein a rare earth element that is at least one of Gd, Tb, Dy, Ho, Y and Er is solid-solved in both of an A site and a B site of $BaTiO_3$ of the dielectric layers.

15 Claims, 2 Drawing Sheets

(58) Field of Classification Search
CPC .......... C04B 2235/96; C04B 2237/346; C04B 2237/68; C04B 35/4682
See application file for complete search history.

(56) References Cited

U.S. PATENT DOCUMENTS

| | | | | |
|---|---|---|---|---|
| 6,078,494 | A * | 6/2000 | Hansen | H01G 4/1227 361/321.5 |
| 7,993,611 | B2 * | 8/2011 | Weir | C01B 13/363 423/1 |
| 8,638,544 | B2 | 1/2014 | Yoon et al. | |
| 10,607,776 | B2 * | 3/2020 | Park | H01G 4/0085 |
| 10,957,485 | B2 * | 3/2021 | Taniguchi | C04B 35/4682 |
| 11,056,280 | B2 * | 7/2021 | Ariizumi | C04B 35/4682 |
| 2005/0219794 | A1 * | 10/2005 | Iguchi | C04B 35/64 361/321.2 |
| 2006/0251927 | A1 * | 11/2006 | Umeda | C04B 35/4682 501/137 |
| 2007/0109720 | A1 * | 5/2007 | Kamei | H05K 1/162 361/321.2 |
| 2009/0128988 | A1 * | 5/2009 | Sohn | C03C 3/089 501/138 |
| 2010/0142120 | A1 * | 6/2010 | Azuma | C01G 45/1264 361/321.5 |
| 2010/0285316 | A1 * | 11/2010 | Weir | C01G 1/02 428/402 |
| 2011/0152060 | A1 * | 6/2011 | Weir | C01G 1/02 501/138 |
| 2011/0212382 | A1 | 9/2011 | Randall et al. | |
| 2012/0033343 | A1 | 2/2012 | Yoon et al. | |
| 2014/0240896 | A1 * | 8/2014 | Morigasaki | H01G 4/30 501/138 |
| 2016/0217924 | A1 | 7/2016 | Morita et al. | |
| 2016/0307701 | A1 * | 10/2016 | Park | H01G 4/1245 |
| 2017/0025222 | A1 * | 1/2017 | Park | H01G 4/1209 |
| 2017/0032894 | A1 | 2/2017 | Kawamura et al. | |
| 2017/0186537 | A1 | 6/2017 | Park et al. | |
| 2017/0372841 | A1 | 12/2017 | Kawamura et al. | |
| 2019/0189345 | A1 * | 6/2019 | Moon | H01G 4/1227 |
| 2019/0241476 | A1 * | 8/2019 | Nomura | C04B 35/62625 |
| 2020/0258685 | A1 * | 8/2020 | Ham | C04B 35/4682 |
| 2021/0183571 | A1 | 6/2021 | Taniguchi et al. | |

FOREIGN PATENT DOCUMENTS

| | | | | |
|---|---|---|---|---|
| JP | H11154620 | A | | 6/1999 |
| JP | 2010034274 | A | | 2/2010 |
| JP | 2013157459 | A | | 8/2013 |
| JP | 2013211398 | A | | 10/2013 |
| JP | 2016139720 | A | | 8/2016 |
| JP | 6635126 | B2 * | 1/2020 | ............. C03C 8/20 |
| NL | 1015886 | C2 | | 2/2002 |
| TW | 200423165 | A | | 11/2004 |
| WO | 2008050863 | A1 | | 5/2008 |

OTHER PUBLICATIONS

An Office Action issued by Taiwan Intellectual Property Office, mailed Mar. 30, 2022, for Taiwan related application No. 108107409. (7 pages).
Final Office Action issued by U.S. Patent and Trademark Office, dated Sep. 17, 2020, for U.S. Appl. No. 16/286,356 (6 pages).
Non-Final Office Action issued by U.S. Patent and Trademark Office, dated Apr. 3, 2020, for U.S. Appl. No. 16/286,356 (12 pages).
Notice of Allowance issued by U.S. Patent and Trademark Office, dated Dec. 30, 2020, for U.S. Appl. No. 16/286,356 (8 pages).
A Notice of Reasons for Refusal issued by the Japanese Patent Office, mailed Feb. 14, 2023, for Japanese related application No. 2018-220281. (3 pages).
Non-Final Office Action issued by U.S. Patent and Trademark Office, dated Mar. 8, 2023, for a co-pending U.S. Appl. No. 17/179,180. (38 pages).
Notice of Allowance issued by U.S. Patent and Trademark Office, dated Aug. 23, 2023, for a co-pending U.S. Appl. No. 17/179,180. (13 pages).
A Request for the Submission of an Opinion issued by Korean Intellectual Property Office on Nov. 13, 2023, for Korean related application No. 10-2019-0021775 (6 pages).
Corrected Notice of Allowance issued by U.S. Patent and Trademark Office, dated Dec. 11, 2023, for a co-pending U.S. Appl. No. 17/179,180. (13 pages).
A Notice of Reasons for Refusal issued by the Japanese Patent Office, mailed Nov. 28, 2023, for Japanese counterpart application No. 2020-070840. (5 pages).
A Decision of Refusal issued by the Japanese Patent Office, mailed Feb. 27, 2024, for Japanese counterpart application No. 2020-070840. (3 pages).
Corrected Notice of Allowance issued by U.S. Patent and Trademark Office, dated Feb. 29, 2024, for a co-pending U.S. Appl. No. 17/179,180. (6 pages).
Corrected Notice of Allowance issued by U.S. Patent and Trademark Office, dated Mar. 11, 2024, for a co-pending U.S. Appl. No. 17/179,180. (6 pages).
Corrected Notice of Allowance issued by U.S. Patent and Trademark Office, dated Jan. 31, 2024, for a co-pending U.S. Appl. No. 17/179,180. (9 pages).
A Notice of Reasons for Refusal issued by the Japanese Patent Office, mailed Feb. 6, 2024, for Japanese related application No. 2022-174380. (3 pages).
A Notice of Termination of Reconsideration by Examiners before Appeal Proceedings issued by the Japanese Patent Office, mailed Jul. 2, 2024, for Japanese counterpart application No. 2020-070840. (1 page).
A Reconsideration Report by Examiner before Appeal issued by the Japanese Patent Office, mailed Jun. 25, 2024, for Japanese counterpart application No. 2020-070840. (3 pages).

* cited by examiner

CERAMIC ELECTRONIC DEVICE INCLUDING A RARE EARTH ELEMENT SOLID-SOLVED IN BARIUM TITANATE OF DIELECTRIC LAYERS

CROSS-REFERENCE TO RELATED APPLICATION

This application is based upon and claims the benefit of priority of the prior Japanese Patent Application No. 2019-113181, filed on Jun. 18, 2019 and Japanese Patent Application No. 2020-070840, filed on Apr. 10, 2020, the entire contents of which are incorporated herein by reference.

FIELD

A certain aspect of the present invention relates to a ceramic electronic device and a manufacturing method of the ceramic electronic device.

BACKGROUND

A ceramic electronic device such as a multilayer ceramic capacitor is widely used as an electronic device having a small size, large capacity and high reliability. Since an electronic apparatus is downsized and has high performance, downsizing and large capacity of the ceramic electronic device are requested.

Pd (palladium) or Pt (platinum) is used for a metal material of an internal electrode layer. However, cost gets larger when the number of the stacked internal electrode layers gets larger. Recently, an inexpensive base metal such as Ni is used for the internal electrode layer. When the base metal is used for the internal electrode layer, a ceramic electronic device is fired in reductive atmosphere so that the base material is not oxidized.

In the reductive atmosphere, oxygen is removed from a part of a dielectric layer. Oxygen defect appears in the dielectric layer. The oxygen defect degrades reliability of the ceramic electronic device. It is therefore preferable to remove the oxygen defect by an annealing process. However, the oxygen supplied by the annealing process tends to be dispersed and causes capacity aging. And so, Japanese Patent Application Publication No. 2013-157459 discloses a method of controlling an oxidation condition of the internal electrode layer.

SUMMARY OF THE INVENTION

However, when the internal electrode layer is oxidized, a continuous modulus of the internal electrode layer may be reduced. And electrostatic capacity may be reduced.

The present invention has a purpose of providing a ceramic electronic device that is capable of achieving high electrostatic capacity and suppressing chronological change and a manufacturing method of the ceramic electronic device.

According to an aspect of the present invention, there is provided a ceramic electronic device including: a multilayer chip in which each of dielectric layers and each of internal electrode layers are alternately stacked, a main component of the dielectric layers being $BaTiO_3$, wherein a rare earth element that is at least one of Gd, Tb, Dy, Ho, Y and Er is solid-solved in both of an A site and a B site of $BaTiO_3$ of the dielectric layers.

According to another aspect of the present invention, there is provides a manufacturing method of a ceramic electronic device including: forming a plurality of green sheets including a dielectric material of which a main component ceramic is $BaTiO_3$; forming a multilayer structure by alternately stacking each of the plurality of green sheets and conductive paste for forming an internal electrode; forming a multilayer chip by firing the multilayer structure, the multilayer chip having a structure in which each of dielectric layers and each of internal electrode layers are alternately stacked, a main component of the dielectric layers being $BaTiO_3$, wherein a rare earth element that is at least one of Gd, Tb, Dy, Ho, Y and Er is solid-solved in both of an A site and a B site of $BaTiO_3$ of the dielectric layers.

DETAILED DESCRIPTION

A description will be given of an embodiment with reference to the accompanying drawings.

Figure 1:
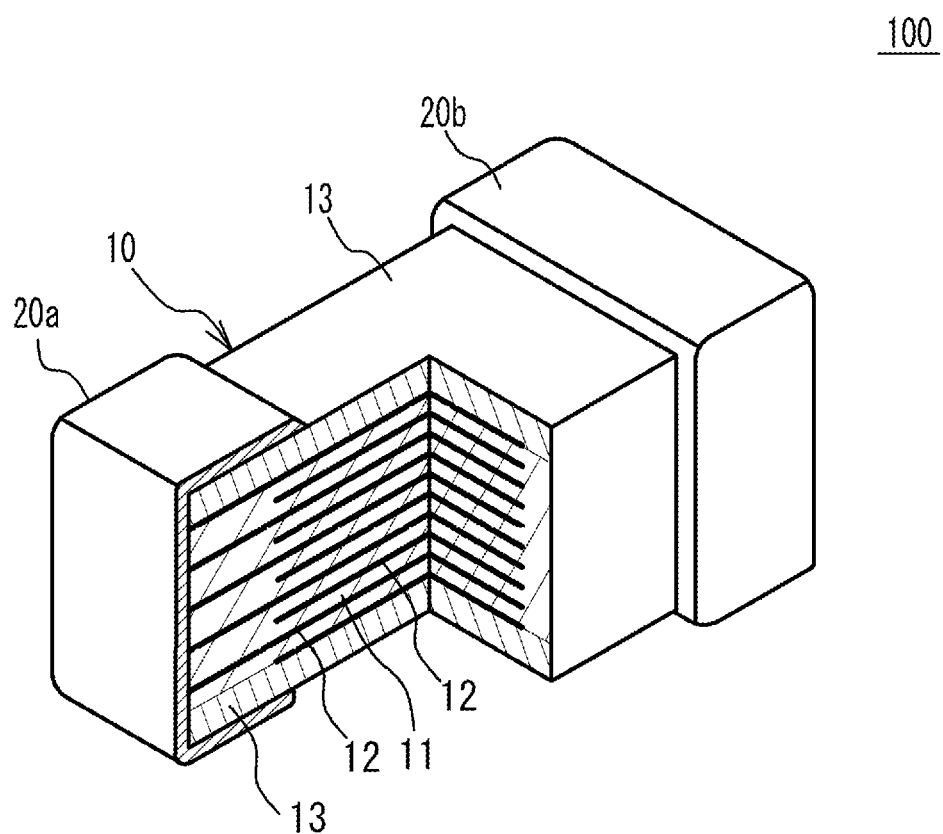
FIG. 1 illustrates a perspective view of a multilayer ceramic capacitor in which a cross section of a part of the multilayer ceramic capacitor is illustrated.

(Embodiment) FIG. 1 illustrates a perspective view of a multilayer ceramic capacitor 100 in accordance with an embodiment, in which a cross section of a part of the multilayer ceramic capacitor 100 is illustrated.. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

The dielectric layers 11 are mainly composed of $BaTiO_3$ of which a main phase has a perovskite structure expressed by a general formula $ABO_3$. For example, the dielectric layers 11 are formed by firing a dielectric material of which a main component is a ceramic material having a perovskite structure.

When a base metal is used for the internal electrode layers 12 in order to reduce cost, the multilayer ceramic capacitor 100 is formed by a firing process in reductive atmosphere so that the base metal is not oxidized. In this case, the dielectric material is exposed to the reductive atmosphere during the firing process. Therefore, an oxygen defect appears in $ABO_3$ of the dielectric material. When the multilayer ceramic capacitor 100 is used, a voltage is repeatedly applied to the dielectric layers 11. In this case, the oxygen defect moves. And a barrier is broken. That is, the oxygen defect in the perovskite structure causes degradation of the reliability of the dielectric layers 11. And so, it is preferable that an amount of the oxygen defect is reduced by an annealing process. However, oxygen supplied by the annealing process tends to disperse and causes capacity aging (chronological change of capacity). It is thought that the oxidation condition of the internal electrode layer 12 is controlled in order to solve the problem. However, when the internal electrode layers 12 are oxidized, a continuous modulus of the internal electrode layers 12 may be reduced. And electrostatic capacity may be reduced.

The chronological change of the capacity is caused by formation of defect dipole by an element which is solid-solved in a B site of $BaTiO_3$ acting as a main component of the dielectric layers 11. And so, in the embodiment, a rare earth element which can be solid-solved in both of the A site and the B site of $BaTiO_3$ is solid-solved in both of the A site and the B site of $BaTiO_3$ of the dielectric layers 11. When the rare earth element is solid-solved in the A site, an amount of the element solid-solved in the B site is reduced. Thus, the formation of the defect dipole is suppressed. And the chronological change of the capacity is suppressed. And, in this case, it is not necessary to oxidize the internal electrode layers 12. Therefore, the continuous modulus of the internal electrode layers 12 is suppressed. And high electrostatic capacity is maintained. It is therefore possible to achieve the high electrostatic capacity. And it is possible to suppress the chronological change of the capacity.

An amount of the rare earth element solid-solved in the A site and the B site of $BaTiO_3$ depends on the ionic radius of the rare earth element. A large amount of a rare earth element having a small ionic radius tends to be solid-solved in the B site. On the other hand, a large amount of a rare earth element having a large ionic radius tends to be solid-solved in the A site. And so, it is favorable that a rare earth element having an adequate ionic radius is used.

Table 1 shows ionic radiuses of rare earth elements of which a valence is 3 and of which a coordination number is 6. Exhibition of Table 1 is "R. D. Shannon, Acta Crystallogr., A32, 751(1976)".

TABLE 1

| | | IONIC RADIUS (Å) | |
| --- | --- | --- | --- |
| | VALENCE | COORDINATION NUMBER IS 6 | COORDINATION NUMBER IS 12 |
| Ba | +2 | | 1.610 |
| Ti | +4 | 0.605 | |
| La | +3 | 1.032 | |
| Ce | +3 | 1.010 | |
| Pr | +3 | 0.990 | |
| Nd | +3 | 0.983 | |
| Sm | +3 | 0.958 | |
| Eu | +3 | 0.947 | |
| Gd | +3 | 0.938 | |
| Tb | +3 | 0 923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |

A rare earth element having an ionic radius smaller than that of Er is hardly solid-solved in $BaTiO_3$. Even if the rare earth element is solid-solved in $BaTiO_3$, a large amount of the rare earth element is solid-solved in the B site. And an amount of the defect dipole gets larger. And the chronological change of the capacity gets larger. On the other hand, a large amount of a rare earth element having an ionic radius larger than that of Gd (gadolinium) is solid-solved in the A site. Therefore, the rare earth element promotes the grain growth during the firing process and achieves high electrostatic capacity. And the chronological change of the capacity is suppressed. However, the rare earth element acts as a donor element. Therefore, insulation characteristic is largely degraded. And so, in the embodiment, a rare earth element having an ionic radius which is equal to or larger than that of Er (erbium) and equal to or smaller than Gd is used. Accordingly, in the embodiment, at least one of Gd, Tb (terbium), Dy (dysprosium), Ho (holmium), Y (yttrium) and Er is solid-solved in $BaTiO_3$ acting as the main component ceramic of the dielectric layers 11. These rare earth elements are solid-solved in both of the A site and the B site of $BaTiO_3$. It is therefore possible to achieve the high electrostatic capacity and suppress the chronological change of the capacity.

When an amount of the rare earth element solid-solved in $BaTiO_3$ is large, an amount of the rare earth element solid solved in the B site also increases. In this case, an amount of defect dipole increases. And chronological change of the capacity increases. And so, it is preferable that the amount of the rare earth element solid-solved in $BaTiO_3$ has an upper limit. For example, it is preferable that a ratio of a total amount of the rare earth element solid-solved in $BaTiO_3$ is 2 mol or less, on a presumption that the amount of $BaTiO_3$ is 100 mol. It is more preferable that the ratio of the total amount is 1 mol or less.

On the other hand, when the amount of the rare earth element solid-solved in $BaTiO_3$ is small, it may not be necessarily possible to suppress degradation of insulating characteristic or degradation of reliability caused by movement of the oxygen defect. And so, it is preferable that the total amount of the rare earth element has a lower limit. For example, it is preferable that the ratio of the total amount of the rare earth element solid-solved in $BaTiO_3$ is 0.1 mol or more, on a presumption that the amount of $BaTiO_3$ is 100 mol. It is more preferable that the ratio of the total amount is 0.2 mol or more.

It is preferable that the amount of the rare earth element solid-solved in the A site of $BaTiO_3$ is larger than the amount of the rare earth element solid-solved in the B site of $BaTiO_3$, from a viewpoint of suppression of formation of the defect dipole. It is therefore preferable that at least one of Gd, Dy and Ho is solid-solved, as the rare earth element.

It is preferable that an average crystal grain diameter of $BaTiO_3$ in the dielectric layers 11 is 0.2 μm or less. This is because excessive solid-solving of the additive is suppressed and degradation of the reliability is suppressed, when grain growth is suppressed.

It is preferable that $SiO_2$ (silica) is added to the dielectric layers 11, as a sintering assistant. When an amount of $SiO_2$ added to the dielectric layers 11 is small, promotion of the sintering of $BaTiO_3$ may be insufficient. On the other hand, abnormal grain growth may occur or stability of sintering may be degraded, when the amount of the $SiO_2$ added to the dielectric layers 11 is large. And so, it is preferable that the added amount of $SiO_2$ has an upper limit and a lower limit. For example, it is preferable that a ratio of the added amount of $SiO_2$ is 0.1 mol or more and 5 mol or less, on a presumption that the amount of $BaTiO_3$ in the dielectric layers 11 is 100 mol.

In the embodiment, the rare earth element which can be solid-solved in both of the A site and the B site of $BaTiO_3$ is used. In this case, the grain growth of $BaTiO_3$ is suppressed, compared to a case where a rare earth element which has a large ionic radius and tends to be solid-solved in the A site is used. Therefore, a total amount of MgO and MnO added to the dielectric layers 11 may be reduced. MgO and MnO act as additives for suppressing the grain growth. For example, a ratio of the total amount of MgO and MnO may be 0.6 mol or less, on a presumption that the amount of $BaTiO_3$ in the dielectric layers 11 is 100 mol. On the other hand, it is preferable that the ratio of the total amount of MgO and MnO is 0.08 mol or more on a presumption that the amount of $BaTiO_3$ is 100 mol, from a viewpoint of achieving the high electrostatic capacity of the dielectric layers 11 and suppressing the chronological change of the capacity of the dielectric layers 11.

It is preferable that an average thickness of the dielectric layers 11 is 2 μm or less. This is because increasing of the temperature of densification of the dielectric layers 11 is suppressed, and degradation of the internal electrode layers 12 is suppressed.

Figure 2:
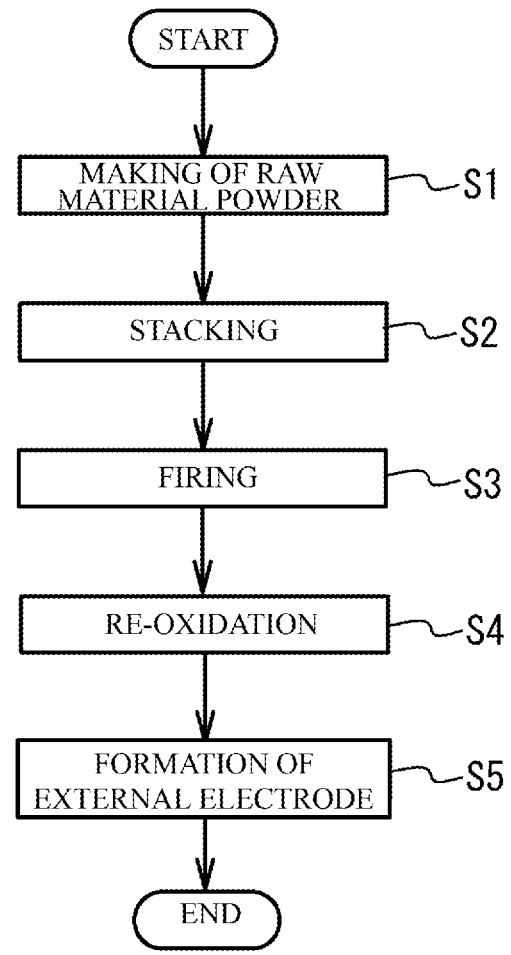
FIG. 2 illustrates a manufacturing method of a multilayer ceramic capacitor.

Next, a description will be given of a manufacturing method of the multilayer ceramic capacitor 100. FIG. 2 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of a rare earth element (Gd, Tb, Dy, Ho, Y and Er), Mn (manganese), Mg (magnesium), Co (cobalt), Ni, Li (lithium), B (boron), Na (sodium), K (potassium) and Si, or glass.

For example, the resulting ceramic raw material powder is wet-blended with additives and is dried and crushed. Thus, a dielectric material is obtained. For example, the grain diameter may be adjusted by crushing the resulting ceramic material as needed. Alternatively, the grain diameter of the resulting ceramic power may be adjusted by combining the crushing and classifying. For example, the grain diameter of $BaTiO_3$ of the ceramic raw material powder is adjusted so that d50 value is 50 nm to 100 nm. And the grain of the rare earth element of the ceramic raw material powder is adjusted so that d50 value is 0.05 μm to 0.3 μm. With the processes, the dielectric material acting as a main component of the dielectric layers is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a stripe-shaped dielectric green sheet with a thickness of 3 μm to 10 μm, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ having an average grain diameter of 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. A cover sheet to be the cover layer 13 is clamped to an upper face of the stacked dielectric green sheets, and another cover sheet to be the cover layer 13 is clamped to a lower face of the stacked dielectric green sheets. The resulting stacked structure is stamped into a predetermined size (for example, 1.0 mm×0.5 mm).

After that, the binder is removed from the ceramic multilayer structure in $N_2$ atmosphere. After that, metal conductive paste for the external electrodes 20a and 20b is provided from the both end faces to the side faces of the ceramic multilayer structure and is dried. The metal conductive paste includes a metal filer, a co-material, a binder, a solvent and so on. The metal conductive paste is to be ground layers of the external electrodes 20a and 20b.

(Firing process) The binder is removed in $N_2$ atmosphere in a temperature range of 250 degrees C. to 500 degrees C. After that, the resulting compact is fired for 10 minutes to 2 hours in a reductive atmosphere having an oxygen partial pressure of $10^{-5}$ to $10^{-8}$ atm in a temperature range of 1100 degrees C. to 1300 degrees C. Thus, each compound is sintered. In this manner, the ceramic multilayer structure is obtained.

(Re-oxidation process) After that, the re-oxidation process is performed in $N_2$ gas atmosphere in a temperature range of 600 degrees C. to 1000 degrees C. In this process, a concentration of the oxygen defect is reduced.

(Formation process of external electrodes) After that, with a plating process, ground layers of the external electrodes 20a and 20b are coated with a metal such as Cu, Ni, and Sn. With the processes, the multilayer ceramic capacitor 100 is manufactured.

In the manufacturing method of the embodiment, the rare earth element which is at least one of Gd, Tb, Dy, Ho, Y and Er is solid-solved in $BaTiO_3$ acting as the main component of the dielectric layers 11. The rare earth element is solid-solved in both of the A site and the B site of $BaTiO_3$. Thus, the high electrostatic capacity is achieved, and the chronological change of the capacity is suppressed.

When an amount of the rare earth element solid-solved in $BaTiO_3$ is large, an amount of the rare earth element solid-solved in the B site increases. In this case, an amount of defect dipole increases. And chronological change of the capacity increases. And so, it is preferable that the amount of the rare earth element added to the dielectric material has an upper limit. For example, it is preferable that a ratio of a total amount of the rare earth element solid-solved in $BaTiO_3$ is 2 mol or less, on a presumption that the amount of $BaTiO_3$ is 100 mol. It is more preferable that the ratio of the total amount is 1 mol or less.

On the other hand, when the amount of the rare earth element solid-solved in $BaTiO_3$ is small, it may not be necessarily possible to suppress degradation of insulating characteristic or degradation of reliability caused by movement of the oxygen defect. And so, it is preferable that the total amount of the rare earth element added to the dielectric material has a lower limit. For example, it is preferable that a ratio of the total amount of the rare earth element solid-solved in $BaTiO_3$ is 0.1 mol or more, on a presumption that the amount of $BaTiO_3$ is 100 mol. It is more preferable that the ratio of the total amount is 0.2 mol or more.

It is preferable that the amount of the rare earth element solid-solved in the A site of $BaTiO_3$ is larger than the amount of the rare earth element solid-solved in the B site of $BaTiO_3$, from a viewpoint of suppression of formation of the defect dipole. It is therefore preferable that at least one of Gd, Tb, Dy and Ho is added to the dielectric material, as the rare earth element.

It is preferable that the condition of the firing process is adjusted so that an average crystal grain diameter of $BaTiO_3$ in the dielectric layers 11 is 0.2 μm or less. This is because excessive solid-solving of the additive is suppressed and degradation of the reliability is suppressed, when grain growth is suppressed.

It is preferable that $SiO_2$ (silica) is added to the dielectric material, as a sintering assistant. When an amount of $SiO_2$ added to the dielectric layers 11 is small, promotion of the sintering of $BaTiO_3$ may be insufficient. On the other hand, abnormal grain growth may occur or stability of sintering may be degraded, when the amount of the $SiO_2$ added to the dielectric layers 11 is large. And so, it is preferable that the added amount of $SiO_2$ has an upper limit and a lower limit. For example, it is preferable that a ratio of the added amount of $SiO_2$ is 0.1 mol or more and 5 mol or less, on a presumption that the amount of $BaTiO_3$ in the dielectric material is 100 mol.

In the embodiment, the rare earth element which can be solid-solved in both of the A site and the B site of $BaTiO_3$ is used. In this case, the grain growth of $BaTiO_3$ is suppressed, compared to a case where a rare earth element which has a large ionic radius and tends to be solid-solved in the A site is used. Therefore, a total amount of MgO and MnO added to the dielectric material may be reduced. For example, a ratio of the total amount of MgO and MnO may be 0.6 mol or less, on a presumption that the amount of $BaTiO_3$ in the dielectric material is 100 mol. A crystal structure of the main component ceramic of the dielectric layers 11 is not a what is called a core-shell structure. Therefore, dielectric constant is 3700 or more.

It is preferable that the condition of the firing process is adjusted so that an average thickness of the dielectric layers 11 is 2 μm or less. This is because increasing of the temperature of densification of the dielectric layers is suppressed, and degradation of the internal electrode layers is suppressed.

In the manufacturing method of the embodiment, the rare earth element is solid-solved in $BaTiO_3$ during the firing process. However, the method is not limited. For example, $BaTiO_3$ powder in which the rare earth element is solid-solved in both of the A site and the B site in advance may be prepared in the making process of the dielectric material.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

$BaTiO_3$ made by a solid-phase reaction method was used as a main component. $SiO_2$, $Gd_2O_3$, MgO and MnO were added as sub components. A ratio of $Gd_2O_3$ was 0.4 mol, a ratio of $SiO_2$ was 1 mol, a ratio of MgO was 0.45 mol, and a ratio of MnO was 0.1 mol, on a presumption that an amount of $BaTiO_3$ was 100 mol. And, the resulting ceramic powder was sufficiently wet-blended and crushed in a ball mil. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added. Next, the metal conductive paste for forming the internal electrode layers was made by mixing metal powder acting as the main component metal of the internal electrode layers 12, a binder, a solvent and necessary assistant agent. The organic binder and the solvent of the metal conductive paste for forming the internal electrode layers were different from those of the dielectric green sheet. The conductive paste for forming the internal electrode layer was printed on the dielectric green sheet by screen-printing. A plurality of the dielectric green sheets on which the metal conductive paste for forming the internal electrode layers were stacked. A cover sheet was stacked on the stacked dielectric green sheets. Another cover sheet was stacked under the stacked dielectric green sheets. After that, a green multilayer structure was obtained by a thermal crimping. And the green multilayer structure was cut into a predetermined size of 1.0 mm×0.5 mm.

After that, the binder was removed from the green multilayer structure in $N_2$ atmosphere. After that, metal paste including a metal filler of which a main component was Ni, a co-material, a binder and a solvent was applied to the both of the edge faces of the green multilayer structure and each side face of the green multilayer structure. And the metal paste was dried. After that, the resulting green multilayer structure was fired for 10 minutes to 2 hours in a reductive atmosphere a temperature range of 1100 degrees C. to 1300 degrees C., together with the metal paste. And a sintered structure was formed. Next, the sintered structure was subjected to the re-oxidation process in $N_2$ atmosphere at 800 degrees C. Thus, the multilayer ceramic capacitor 100 was obtained.

(Example 2) As the rare earth element, $Dy_2O_3$ was added to the dielectric material, instead of $Gd_2O_3$. Other conditions were the same as the example 1.

(Example 3) As the rare earth element, $Ho_2O_3$ was added to the dielectric material, instead of $Gd_2O_3$. Other conditions were the same as the example 1.

(Example 4) As the rare earth element, $Er_2O_3$ was added to the dielectric material, instead of $Gd_2O_3$. Other conditions were the same as the example 1.

(Comparative example 1) As the rare earth element, $Sm_2O_3$ was added to the dielectric material, instead of $Gd_2O_3$. Other conditions were the same as the example 1.

(Comparative example 2) As the rare earth element, $Yb_2O_3$ was added to the dielectric material, instead of $Gd_2O_3$. Other conditions were the same as the example 1.

Table 2 shows added amount ratios of the components of the examples 1 to 4 and the comparative example 1 and 2.

(Analysis) Each average thickness of the dielectric layers of the examples 1 to 4 and the comparative examples 1 and 2 was measured by SEM (Scanning Electron Microscope). Each average thickness was approximately 2 μm. With respect to the multilayer ceramic capacitors of the examples 1 to 4 and the comparative examples 1 and 2, electrostatic capacity was measured by LCR meter (HP4284 made by Hewlett-Packard Company). The multilayer ceramic capacitors of the examples 1 to 4 and the comparative examples 1 and 2 were held for an hour or more at 150 degrees C. After that, electrostatic capacity after 24 hours from the time when the multilayer ceramic capacitors were exposed to a room temperature was measured at a measurement voltage of 0.55 Vrms/μm and at a measurement frequency of 1 kHz. Dielectric constant was calculated from the electrostatic capacity, the thickness of the dielectric layer and an effective electrode area. Chronological change of the capacity was evaluated by calculating a change rate of the dielectric constant after 500 hours with respect to the dielectric constant after 24 hours from the time when the multilayer ceramic capacitors of the examples 1 to 4 and the comparative examples 1 and 2 were exposed to a room temperature after keeping the multilayer ceramic capacitors for one hour or more at 150 degrees C. The chronological change was calculated by dividing a difference between the dielectric constant after 500 hours and the dielectric constant after 24 hours by the dielectric constant after 24 hours.

When the dielectric constant after 24 hours after the thermal treatment at 150 degrees C. or more was 3500 or more, the dielectric constant was determined as good. When the dielectric constant was less than 3500, the dielectric constant was determined as bad. When a reduction rate (chronological change rate) between the dielectric constant after 24 hours from the thermal treatment at 150 degrees C. or more and the dielectric constant after 500 hours was 20% or less, the chronological change was determined as good. When the reduction rate was more than 20%, the chronological change was determined as bad. Table 3 show the results.

TABLE 2

| | $BaTiO_3$ (mol) | $Sm_2O_3$ (mol) | $Gd_2O_3$ (mol) | $Dy_2O_3$ (mol) | $Ho_2O_3$ (mol) | $Er_2O_3$ (mol) | $Yb_2O_3$ (mol) | $SiO_2$ (mol) | MgO (mol) | MnO (mol) |
|---|---|---|---|---|---|---|---|---|---|---|
| COMPARATIVE EXAMPLE 1 | 100 | 0.4 | | | | | | 1 | 0.45 | 0.1 |
| EXAMPLE 1 | 100 | | 0.4 | | | | | 1 | 0.45 | 0.1 |
| EXAMPLE 2 | 100 | | | 0.4 | | | | 1 | 0.45 | 0.1 |
| EXAMPLE 3 | 100 | | | | 0.4 | | | 1 | 0.45 | 0.1 |
| EXAMPLE 4 | 100 | | | | | 0.4 | | 1 | 0.45 | 0.1 |
| COMPARATIVE EXAMPLE 2 | 100 | | | | | | 0.4 | 1 | 0.45 | 0.1 |

TABLE 3

| | RARE EARTH ELEMENT | CHRONOLOGICAL CHANGE OF CAPACITY (%) | DIELECTRIC CONSTANT | CHRONO-LOGICAL CHANGE PROPERTY | DIELECTRIC CONSTANT PROPERTY |
|---|---|---|---|---|---|
| COMPARATIVE EXAMPLE 1 | Sm | 1 | 8600 | GOOD | GOOD |
| EXAMPLE 1 | Gd | 4 | 5700 | GOOD | GOOD |
| EXAMPLE 2 | Dy | 5 | 4900 | GOOD | GOOD |
| EXAMPLE 3 | Ho | 7 | 5500 | GOOD | GOOD |
| EXAMPLE 4 | Er | 13 | 5900 | GOOD | GOOD |
| COMPARATIVE EXAMPLE 2 | Yb | 36 | 3300 | BAD | BAD |

In the comparative example 1, it is thought that a solid-solving ratio of Sm into the A site and the B site was 10:0. In the example 1, it is thought that the solid-solving ratio of Gd into the A site and the B site was 8.5:1.5. In the example 2, it is thought that the solid-solving ratio of Dy into the A site and the B site was 7:3. In the example 3, it is thought that the solid-solving ratio of Ho into the A site and the B site was 6.5:3.5. In the example 4, it is thought that the solid-solving ratio of Er into the A site and the B site was 3:7. In the comparative example 2, it is thought that the solid-solving ratio of Yb into the A site and the B site was 0:10.

In the examples 1 to 4, the dielectric constant was determined as good, and the chronological change was determined as good. It is thought that this was because the rare earth element was solid-solved in both of the A site and the B site of $BaTiO_3$ acting as the main component ceramic of the dielectric layers 11.

On the other hand, in the comparative example 2, the dielectric constant was determined as bad, and the chronological change was determined as bad. It is thought that this was because Yb was hardly solid-solved in $BaTiO_3$ or a large amount of Yb was solid-solved in the B site, and the chronological change of the capacity was very large. And, it is though that this was because the grain growth was prevented.

In the comparative example 1, the dielectric constant was determined as good, and the chronological change was determined as good. However, the reliability such as the lifetime other than the electrical characteristic was very bad, and the comparative example 1 did not act as a multilayer ceramic capacitor. It is thought that this was because a large amount of Sm was solid-solved in the A site, and the insulation characteristic was degraded.

From the results, when the ionic radius of the rare earth element is controlled among Gd, Tb, Dy, Ho, Y and Er, the rare earth element is solid-solved in both of the A site and the B site with good balance. And chronological change of the capacity estimated by the ionic radius was achieved. However, the multilayer ceramic capacity having favorable chronological change characteristic within an allowable range and achieving high electrostatic capacity is obtained.

From the results, the multilayer ceramic capacitor having high electrostatic capacity and small capacity aging is obtained, when the rare earth element is solid-solved in $BaTiO_3$ with an adequate solid-solving ratio in order to achieve favorable characteristic by the firing in reductive atmosphere in which the internal electrode layers 12 are not oxidized.

(Examples 5 to 8) In an example 5, the added amount of $Ho_2O_3$ was 0.1 mol. Other conditions were the same as those of the example 3. In an example 6, the added amount of $Ho_2O_3$ was 0.2 mol. Other conditions were the same as those of the example 3. In an example 7, the added amount of $Ho_2O_3$ was 0.5 mol. Other conditions were the same as those of the example 3. In an example 8, the added amount of $Ho_2O_3$ was 1 mol. Other conditions were the same as those of the example 3. The added amount of $Ho_2O_3$ was a ratio with respect 100 mol of $BaTiO_3$.

(Analysis) The chronological change rate of the capacity and the dielectric constant were measured by the same method as the examples 1 to 4. Table 4 shows the measured results. As shown in Table 4, when the added amount of $Ho_2O_3$ was 2 mol or less, the high electrostatic capacity was achieved and the chronological change of the capacity was suppressed.

TABLE 4

| | $Ho_2O_3$ (mol) | CHRONOLOGICAL CHANGE OF CAPACITY (%) | DIELECTRIC CONSTANT | CHRONO-LOGICAL CHANGE PROPERTY | DIELECTRIC CONSTANT PROPERTY |
|---|---|---|---|---|---|
| EXAMPLE 5 | 0.1 | 5 | 4100 | GOOD | GOOD |
| EXAMPLE 6 | 0.2 | 8 | 4800 | GOOD | GOOD |
| EXAMPLE 7 | 0.5 | 9 | 5700 | GOOD | GOOD |
| EXAMPLE 8 | 1 | 17 | 3900 | GOOD | GOOD |

(Examples 9 to 11) In an example 9, the added amount of $SiO_2$ was 0.1 mol. Other conditions were the same as those of the example 3. In an example 10, the added amount of $SiO_2$ was 1 mol. Other conditions were the same as those of the example 3. In an example 11, the added amount of $SiO_2$ was 5 mol. Other conditions were the same as those of the example 3. The added amount of $SiO_2$ was a ratio with respect 100 mol of $BaTiO_3$.

(Analysis) The chronological change rate of the capacity and the dielectric constant were measured by the same method as the examples 1 to 4. Table 5 shows the measured results. As shown in Table 5, when the added amount of $SiO_2$ was 5 mol or less, the high electrostatic capacity was achieved and the chronological change of the capacity was reduced to 20% or less.

TABLE 5

|  | SiO$_3$ (mol) | CHRONOLOGICAL CHANGE OF CAPACITY (%) | DIELECTRIC CONSTANT | CHRONO-LOGICAL CHANGE PROPERTY | DIELECTRIC CONSTANT PROPERTY |
|---|---|---|---|---|---|
| EXAMPLE 9 | 0.1 | 7 | 5500 | GOOD | GOOD |
| EXAMPLE 10 | 1 | 6 | 4600 | GOOD | GOOD |
| EXAMPLE 11 | 5 | 10 | 3700 | GOOD | GOOD |

(Examples 12 to 14) In an example 12, the added amount of MgO was 0.05 mol, and the added amount of MnO was 0.03 mol, and the total added amount of MgO and MnO was 0.08 mol. Other conditions were the same as those of the example 3. In an example 13, the added amount of MgO was 0.2 mol, and the added amount of MnO was 0.05 mol, and the total added amount of MgO and MnO was 0.25 mol. Other conditions were the same as those of the example 3. In an example 14, the added amount of MgO was 0.2 mol, and the added amount of MnO was 0.2 mol, and the total added amount of MgO and MnO was 0.4 mol. Other conditions were the same as those of the example 3.

(Analysis) The chronological change rate of the capacity and the dielectric constant were measured by the same method as the examples 1 to 4. Table 6 shows the measured results. As shown in Table 6, in the example 12, the total amount of MgO and MnO that were solid-solved in the B site was small. The grain growth was promoted more than the example 3. The dielectric constant was a high value that was 6900. In the example 13, the total amount of MgO and MnO that were solid-solved in the B site was small. The grain growth was promoted more than the example 3. The dielectric constant was a high value that was 6100. In the example 14, the total amount of MgO and MnO that were solid-solved in the B site was 0.4 mol. The dielectric constant was 5600. From the results of the examples 12 to 14, when the added amount of SiO$_2$ was 5 mol or less, the high electrostatic capacity was achieved and the chronological change of the capacity was reduced to 20% or less.

TABLE 6

|  | MgO (mol) | MnO (mol) | CHRONOLOGICAL CHANGE OF CAPACITY (%) | DIELECTRIC CONSTANT | CHRONOLOGICAL CHANGE PROPERTY | DIELECTRIC CONSTANT PROPERTY |
|---|---|---|---|---|---|---|
| EXAMPLE 12 | 0.05 | 0.03 | 7 | 6900 | GOOD | GOOD |
| EXAMPLE 13 | 0.2 | 0.05 | 6 | 6100 | GOOD | GOOD |
| EXAMPLE 14 | 0.2 | 0.2 | 3 | 5600 | GOOD | GOOD |

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer chip in which each of dielectric layers and each of internal electrode layers are alternately stacked,
   a main component of the dielectric layers being BaTiO$_3$,
   wherein a rare earth element that is solid-solved in both of an A site and a B site of BaTiO$_3$ of the dielectric layers, consists of Ho,
   wherein a total amount of the rare earth element in each of the dielectric layers is 1 mol or less on a presumption that an amount of BaTiO$_3$ is 100 mol,
   wherein, in the dielectric layers, an amount of each of MgO and MnO is more than 0 mol, and a total amount of MgO and MnO is 0.08 or more but 0.55 mol or less, on a presumption that an amount of BaTiO$_3$ is 100 mol.

2. The ceramic electronic device as claimed in claim 1, wherein a main component of the internal electrode layers is a base metal.

3. The ceramic electronic device as claimed in claim 1, wherein an average crystal grain diameter of BaTiO$_3$ in the dielectric layers is 0.2 μm or less.

4. The ceramic electronic device as claimed in claim 1, wherein an average thickness of the dielectric layers is 2 μm or less.

5. The ceramic electronic device as claimed in claim 1, wherein a total amount of the rare earth element that is solid-solved is 0.1 mol or more and 0.4 mol or less on a presumption that an amount of BaTiO$_3$ of the dielectric layers is 100 mol.

6. The ceramic electronic device as claimed in claim 1, wherein an amount of SiO$_2$ in each of the dielectric layers is 0.1 mol or more and 5 mol or less on a presumption that an amount of BaTiO$_3$ is 100 mol.

7. The ceramic electronic device as claimed in claim 1, wherein an amount of SiO$_2$ in each of the dielectric layers is 0.1 mol or more and 1 mol or less on a presumption that an amount of BaTiO$_3$ is 100 mol.

8. The ceramic electronic device as claimed in claim 1, wherein the total amount of MgO and MnO is 0.25 or more but 0.55 mol or less.

9. A ceramic electronic device comprising:
   a multilayer chip in which each of dielectric layers and each of internal electrode layers are alternately stacked,
   a main component of the dielectric layers being BaTiO$_3$,
   wherein a rare earth element that is solid-solved in both of an A site and a B site of BaTiO$_3$ of the dielectric layers, consists of Ho,
   wherein an amount of the rare earth element that is solid-solved in the A site of BaTiO$_3$ is larger than an amount of the rare earth element that is solid-solved in the B site of BaTiO$_3$, and
   wherein, in the dielectric layers, an amount of each of MgO and MnO is more than 0 mol, and a total amount of MgO and MnO is 0.25 or more but 0.4 mol or less, on a presumption that an amount of BaTiO$_3$ is 100 mol.

10. The ceramic electronic device as claimed in claim 9, wherein a main component of the internal electrode layers is a base metal.

11. The ceramic electronic device as claimed in claim 9, wherein an average crystal grain diameter of $BaTiO_3$ in the dielectric layers is 0.2 μm or less.

12. The ceramic electronic device as claimed in claim 9, wherein an average thickness of the dielectric layers is 2 μm or less.

13. The ceramic electronic device as claimed in claim 9, wherein a total amount of the rare earth element that is solid-solved is 0.1 mol or more and 0.4 mol or less on a presumption that an amount of $BaTiO_3$ of the dielectric layers is 100 mol.

14. The ceramic electronic device as claimed in claim 9, wherein an amount of $SiO_2$ in each of the dielectric layers is 0.1 mol or more and 5 mol or less on a presumption that an amount of $BaTiO_3$ is 100 mol.

15. The ceramic electronic device as claimed in claim 9, wherein an amount of $SiO_2$ in each of the dielectric layers is 0.1 mol or more and 1 mol or less on a presumption that an amount of $BaTiO_3$ is 100 mol.

* * * * *